United States Patent
Moroishi et al.

(10) Patent No.: US 7,993,497 B2
(45) Date of Patent: Aug. 9, 2011

(54) MAGNETIC DISK AND MAGNETIC DISK MANUFACTURING METHOD

(75) Inventors: Keiji Moroishi, Singapore (SG); Chor Boon Ang, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 532 days.

(21) Appl. No.: 11/602,207

(22) Filed: Nov. 21, 2006

(65) Prior Publication Data

US 2007/0128471 A1     Jun. 7, 2007

(51) Int. Cl.
*C23C 14/34*     (2006.01)
*C23C 16/00*     (2006.01)

(52) U.S. Cl. .............. 204/192.2; 427/129; 427/130; 427/131; 427/132

(58) Field of Classification Search ........... 204/192.2; 427/127, 128, 129, 130, 131, 132
See application file for complete search history.

(56) References Cited

U.S. PATENT DOCUMENTS

| | | | | |
|---|---|---|---|---|
| 5,232,566 A | * | 8/1993 | Edmonson et al. | 204/192.1 |
| 5,626,920 A | * | 5/1997 | Weir et al. | 427/530 |
| 5,626,970 A | * | 5/1997 | Hedgcoth | 428/611 |
| 5,741,403 A | * | 4/1998 | Tenhover et al. | 204/192.2 |
| 5,789,056 A | | 8/1998 | Bian et al. | |
| 5,800,931 A | | 9/1998 | Lee et al. | |
| 6,348,276 B1 | * | 2/2002 | Chen et al. | 428/831 |
| 6,596,419 B1 | * | 7/2003 | Chen et al. | 428/832.2 |
| 2003/0152810 A1 | * | 8/2003 | Kawai et al. | 428/695 |
| 2004/0161577 A1 | * | 8/2004 | Umezawa et al. | 428/65.3 |
| 2004/0258925 A1 | * | 12/2004 | Lee et al. | 428/426 |

FOREIGN PATENT DOCUMENTS

| | | | |
|---|---|---|---|
| JP | 01-165755 | * | 6/1989 |
| JP | 2004-86936 A | | 3/2004 |
| JP | 2004-152424 A | | 5/2004 |
| JP | 2004-326844 A | | 11/2004 |

* cited by examiner

*Primary Examiner* — Rodney G McDonald

(57) ABSTRACT

In a magnetic disk having at least a glass substrate, a plurality of underlayers formed over the glass substrate, and a magnetic layer formed over the plurality of underlayers, at least one of the underlayers is an amorphous underlayer containing a VIa group element and carbon and, given that the remanent magnetization in a circumferential direction of the disk is Mrc and the remanent magnetization in a radial direction of the disk is Mrr, the magnetic disk has a magnetic anisotropy in which Mrc/Mrr being a ratio between Mrc and Mrr exceeds 1.

9 Claims, No Drawings

MAGNETIC DISK AND MAGNETIC DISK MANUFACTURING METHOD

BACKGROUND OF THE INVENTION

This invention relates to a magnetic disk to be mounted in a magnetic disk device such as a hard disk drive (HDD) and a manufacturing method of the magnetic disk.

A magnetic disk is a magnetic recording medium to be mounted in a magnetic disk device such as a hard disk drive (HDD). A hard disk drive has at least a magnetic disk and a magnetic head. With this structure, information is recorded on and reproduced from the magnetic disk by the magnetic head.

The magnetic disk is formed by stacking layers such as an underlayer, a magnetic layer, a protection layer, and a lubrication layer in this order on a substrate.

The underlayer is a layer formed for controlling grains of the magnetic layer and has a function of controlling an easy magnetization direction of the magnetic layer to be oriented in an in-plane direction of the disk or in a normal direction of the disk.

The underlayer also has a function of controlling the grain size of the magnetic layer.

The underlayer serves to miniaturize grains of the magnetic layer and, for example, exhibits a function of improving the signal-to-noise intensity ratio (S/N) of the magnetic recording medium or a function of improving the static magnetic properties thereof.

A technique with respect to an underlayer is disclosed, for example, in United States Letters Patent, U.S. Pat. No. 5,800,931 Publication. This U.S. Pat. No. 5,800,931 Publication describes that it is preferable to use an underlayer having a B2 crystal structure such as NiAl or FeAl.

As another technique, there is known, for example, a technique described in United States Letters Patent, U.S. Pat. No. 5,789,056 Publication. This U.S. Pat. No. 5,789,056 Publication describes a technique to interpose a CrTi alloy layer between a substrate and an underlayer.

As still another technique, there is known a technique of Japanese Unexamined Patent Application Publication, Tokkai 2004-086936 Publication (Japanese patent application Laid Open Kokai No. 2004-086936). In this technique, it is disclosed to use an alloy underlayer having a Fe7W6 structure. This publication discloses that use can be made, as an alloy forming the Fe7W6 structure, of each of various alloys such as a Co—W based alloy, a Co—Mo based alloy, a Co—Ta based alloy, a Co—Nb based alloy, a Ni—Ta based alloy, Ni—Nb based alloy, a Fe—W based alloy, a Fe—Mo based alloy, and a Fe—Nb based alloy.

As still another technique, there is known a technique of Japanese Unexamined Patent Application Publication, Tokkai 2004-326844 Publication (Japanese patent application Laid Open Kokai No. 2004-326844). In this publication, it is disclosed to use a nonmagnetic amorphous layer. This publication discloses that use can be made, as the nonmagnetic amorphous layer, of each of various alloys such as NiP, NiPB, NiZr, NiZrB, NiCrMoC, FeB, FeP, FePC, FeZrB, FeCrMoPC, CoZr, CoZrB, TiCr, CrB, TaB, CrTa, NiTa, CoW, and CoTa.

As still another technique, there is known a technique of Japanese Unexamined Patent Application Publication, Tokkai 2004-152424 Publication (Japanese patent application Laid Open Kokai No. 2004-152424). This publication discloses that use can be made of a W—Ru based alloy layer, a W—Re based alloy layer, a Mo—Ru based alloy layer, or a Mo—Re based alloy layer.

In recent years, the storage information amount required to HDDs has significantly increased. Recently, the information recording density has been required to be 60 Gbits/inch$^2$ or more. In order to satisfy such a requirement for higher recording density, various developments have been made, but it has become difficult to achieve a sufficient S/N ratio.

Further, it has been required to achieve a sufficient S/N ratio even when information is recorded/reproduced at a high recording density of 800 kfci or more as a linear recording density.

SUMMARY OF THE INVENTION

A first object of this invention is to provide a low-noise magnetic disk that can achieve such a high recording density.

Further, a second object of this invention is to provide a magnetic disk having a magnetic anisotropy suitable for achieving such a high recording density.

A third object of this invention is to provide a magnetic disk suitable for being mounted on a hard disk drive (HDD) that performs recording/reproduction at a linear recording density of 800 kfci or more.

A fourth object of this invention is to provide a magnetic disk suitable for being mounted on a hard disk drive (HDD) that performs recording/reproduction at an areal recording density of 60 Gbits/inch$^2$ or more.

This invention can include the following invention structures.

(Structure 1)

A magnetic disk, comprising:

a glass substrate, a plurality of underlayers formed over the glass substrate, and a magnetic layer formed over the plurality of underlayers, wherein at least one of the underlayers is a first amorphous underlayer containing a VIa group element and carbon, and given that a remanent magnetization in a circumferential direction of the disk is Mrc and a remanent magnetization in a radial direction of the disk is Mrr, the magnetic disk has a magnetic anisotropy in which Mrc/Mrr being a ratio between the Mrc and Mrr exceeds 1.

(Structure 2)

A magnetic disk, comprising:

a glass substrate, a plurality of underlayers formed over the glass substrate, and a magnetic layer formed over the plurality of underlayers, wherein at least one of said underlayers is a first amorphous underlayer containing W or Mo, and given that a remanent magnetization in a circumferential direction of the disk is Mrc and a remanent magnetization in a radial direction of the disk is Mrr, the magnetic disk has a magnetic anisotropy in which Mrc/Mrr being a ratio between the Mrc and Mrr exceeds 1.

(Structure 3)

The magnetic disk according to Structure 1 or 2, wherein: the first amorphous underlayer contains oxygen.

(Structure 4)

The magnetic disk according to Structure 1 or 2, further comprising:

a second amorphous underlayer containing Cr and Ti between the first amorphous underlayer and the glass substrate.

(Structure 5)

The magnetic disk according to Structure 1 or 2, comprising:

at least one crystalline underlayer having a body-centered cubic structure between the first amorphous underlayer and the magnetic layer.

(Structure 6)

The magnetic disk according to Structure 1 or 2, wherein:

the at least one crystalline underlayer has a body-centered cubic structure with a lattice constant smaller than that of a Cr metal.

(Structure 7)

A method of manufacturing a magnetic disk, comprising:

preparing a disk-shaped glass substrate having a surface formed with a texture having substantially regular stripes along a disk circumferential direction, forming an amorphous underlayer in a carbon-containing atmosphere using a material containing a VIa group element over the glass substrate, and forming at least a magnetic layer over the amorphous underlayer.

(Structure 8)

The magnetic disk manufacturing method according to Structure 7, wherein:

the amorphous underlayer is formed by reactive sputtering in the atmosphere containing carbon using a target containing the VIa group element.

(Structure 9)

A method of manufacturing a magnetic disk, comprising:

preparing a disk-shaped glass substrate having a surface formed with a texture having substantially regular stripes along a disk circumferential direction, forming an amorphous underlayer containing a VIa group element over the glass substrate, bringing the amorphous underlayer into contact with a carbon-containing atmosphere, and forming at least a magnetic layer over the amorphous underlayer.

(Structure 10)

A method of manufacturing a magnetic disk, comprising:

preparing a disk-shaped glass substrate having a surface formed with a texture having substantially regular stripes along a disk circumferential direction, forming an amorphous underlayer using a material containing W or Mo over the glass substrate, and forming at least a magnetic layer over the amorphous underlayer.

(Structure 11)

The magnetic disk manufacturing method according to any one of Structures 7 to 10, wherein:

the prepared glass substrate is disposed in a vacuum chamber, and the amorphous underlayer is formed without performing heat treatment.

BRIEF DESCRIPTION OF THE DRAWINGS

Sole FIGURE is an exemplary diagram of a magnetic disk according to this invention.

DETAILED DESCRIPTION OF THE INVENTION

In this invention, an amorphous glass substrate, a crystallized glass substrate, or the like can be used as a glass substrate. Particularly, it is preferable to use the amorphous glass substrate.

In this invention, an amorphous underlayer is configured to include a VIa group element. The VIa group element is an element classified into the VIa group in the periodic table. W (tungsten), Mo (molybdenum), and Cr (chromium) are included as VIa group elements.

In this invention, the amorphous underlayer is preferably made of a W-based alloy or a Mo-based alloy.

In this invention, the content of an element, other than W, forming the W-based alloy is not particularly limited as long as it falls within a range that can form the amorphous underlayer.

In this invention, the content of an element, other than Mo, forming the Mo-based alloy is not particularly limited as long as it falls within a range that can form the amorphous underlayer.

In this invention, it is preferable to use a WCr-based alloy material or a MoCr-based alloy material in forming the amorphous underlayer. Particularly, it is preferable to use a WCr alloy material.

When using a WCr-based alloy, the composition ratio of W and Cr is not particularly limited as long as it falls within a range that can form an amorphous layer, but Cr is preferably set to 25 at % to 75 at %. If the composition ratio of Cr in the WCr alloy exceeds 75 at %, a film may include a body-centered cubic structure.

When using a MoCr-based alloy, the composition ratio of Mo and Cr is not particularly limited as long as it falls within a range that can form an amorphous layer, but Cr is preferably set to 25 at % to 75 at %. If the composition ratio of Cr in the MoCr alloy exceeds 75 at %, a film may include a body-centered cubic structure.

In this invention, it is preferable to contain C (carbon) in forming the amorphous underlayer. The present inventor has found that if C (carbon) is contained in an amorphous underlayer containing a VIa group element, particularly W (tungsten), the function of increasing a magnetic anisotropy is exhibited.

In this invention, O (oxygen) may be contained upon forming the amorphous underlayer. In this invention, it is preferable to contain C (carbon) and O (oxygen) upon forming the amorphous underlayer.

A magnetic disk according to this invention is configured such that, given that the remanent magnetization in a circumferential direction of the disk is Mrc and the remanent magnetization in a radial direction of the disk is Mrr, there is obtained a magnetic anisotropy in which Mrc/Mrr being a ratio between Mrc and Mrr exceeds 1.

With respect to a preferable magnetic anisotropy range, it is preferable to configure such that, for example, Mrc/Mrr is 1.5 or more, particularly 1.7 or more. It is not particularly necessary to provide an upper limit to the magnetic anisotropy. However, if the magnetic anisotropy extremely increases, noise may increase at outer edge portions of a recording track. Therefore, it is possible to set an upper limit value of the magnetic anisotropy so as to prevent noise from increasing at the outer edge portions of the recording track and impeding realization of an information recording density of 60 Gbits/inch$^2$ or more.

In this invention, amorphous represents a state where a clear peak is not observed when analyzed, for example, using XRD (X-ray diffraction method) or the like. From another aspect, amorphous represents a state where crystals have no long-range order. From a further aspect, amorphous represents a state where crystals may have short-range order. That is, in this invention, amorphous includes both an amorphous state having neither long-range order nor short-range order and an amorphous state containing crystallites.

In this invention, given that the foregoing amorphous underlayer is called a first amorphous underlayer, a second amorphous underlayer can be formed between the foregoing glass and the foregoing first amorphous underlayer. Further, a crystalline underlayer having a body-centered cubic structure can be formed between the first amorphous underlayer and a magnetic layer.

As the second amorphous underlayer, a Cr-based alloy layer can be preferably used. A CrTi-based alloy layer is preferable as this second amorphous underlayer.

The crystalline underlayer may comprise a plurality of layers and at least one of them is preferably an underlayer having a body-centered cubic structure with a lattice constant smaller than that of a Cr metal. The underlayer having the body-centered cubic structure with the lattice constant smaller than that of the Cr metal is preferably formed so as to be in contact with the foregoing first amorphous underlayer.

As a material having the body-centered cubic structure with the lattice constant smaller than that of the Cr metal, use is made of an alloy containing Cr and an element having an atomic radius smaller than that of Cr. As the element having the atomic radius smaller than that of Cr, use can be made of a fourth period element in the periodic table, such as, for example, Mn, Fe, Co, Ni, Cu, Zn, Ga, Ge, As, or Se. In this invention, a CrMn-based alloy can be preferably used as the material having the body-centered cubic structure with the lattice constant smaller than that of the Cr metal.

In the CrMn-based alloy, the composition of Mn is preferably set to 10 at % or more.

This invention can be characterized by a magnetic disk in which a crystalline underlayer of a body-centered cubic structure containing a VIa group element is formed so as to be in contact with an amorphous underlayer containing a VIa group element.

This invention can be characterized by a magnetic disk in which a crystalline underlayer of a body-centered cubic structure made of a CrMn-based alloy is formed so as to be in contact with an amorphous underlayer made of a WCr-based alloy.

This invention can be characterized by a magnetic disk having a second amorphous underlayer made of a CrTi-based alloy on a glass substrate, a first amorphous underlayer made of a WCr-based alloy on the second amorphous underlayer, and a crystalline underlayer made of a CrMn-based alloy on the second amorphous underlayer.

In this invention, the surface of the glass substrate is preferably formed with substantially regular stripe grooves along the circumferential direction of the disk. According to this invention, there is obtained a magnetic disk having a magnetic anisotropy in which Mrc/Mrr exceeds 1.

In this invention, the surface of the glass substrate is preferably formed with a texture that provides a magnetic anisotropy to a magnetic layer. According to this invention, there is obtained a magnetic disk having a magnetic anisotropy in which Mrc/Mrr exceeds 1.

Such a texture can be formed using a mechanical polishing method that brings a polishing tape into contact with a disk-shaped glass substrate and relatively moves the glass substrate and the tape.

As the shape of the texture, there can be cited, for example, a state where when the surface of the glass substrate is observed by an atomic force microscope, many stripes are formed substantially regularly along the circumferential direction of the disk. As the surface roughness of the glass substrate, there can be preferably cited a mirror surface with Ry of 5 nm or less and Ra of 0.5 nm or less.

In this invention, the amorphous layer containing the VIa group element is preferably formed in a carbon atmosphere. The carbon atmosphere is an atmosphere containing carbon element. For example, use can be made of an atmosphere containing carbon dioxide, an atmosphere containing carbon monoxide, an atmosphere containing hydrocarbon, or the like.

By the use of carbon dioxide or carbon monoxide, oxygen can be contained in the amorphous layer containing the VIa group element.

In this invention, the amorphous underlayer containing the VIa group element is preferably formed by performing sputtering in an atmosphere containing carbon by the use of a sputtering target containing the VIa group element.

In this invention, the amorphous underlayer is preferably formed by performing sputtering in an atmosphere containing carbon dioxide or carbon monoxide by the use of a sputtering target containing W (tungsten) or Mo (molybdenum).

Particularly, it is preferable to perform reactive sputtering.

The present inventor has found that when an amorphous underlayer is formed by performing sputtering in an atmosphere containing carbon dioxide by the use of a material containing a VIa group element, particularly a sputtering target containing W (tungsten), there is exhibited a function of increasing the magnetic anisotropy. This invention has been made based on this finding.

In this invention, treatment may be carried out to bring an amorphous film formed using a material containing a VIa group element into contact with a carbon-containing atmosphere.

In this invention, it is preferable to form the amorphous underlayer on the glass substrate without performing heat treatment of the glass substrate. Assuming that the heat treatment is carried out and the amorphous underlayer is formed on the glass substrate treated to, for example, a temperature exceeding 200° C., an increase in magnetic anisotropy may be impeded. In this invention, it is preferable to form the amorphous underlayer on the surface of the glass substrate having a temperature of 200° C. or less, preferably 150° C. or less, and particularly preferably 100° C. or less.

EXAMPLE

A magnetic disk being one of the best modes for carrying out this invention will be described with reference to an exemplary diagram of the magnetic disk shown in the accompanying drawing. The magnetic disk of this embodiment is used as an Example.

In this embodiment, a magnetic disk 100 comprises an underlayer 2, a first magnetic layer 3, a spacer layer 4, a second magnetic layer 5, a third magnetic layer 6, a protection layer 7, and a lubrication layer 8 which are stacked in this order on a glass substrate 1.

The underlayer 2 is formed by stacking a plurality of layers. An amorphous underlayer 21 is formed on the side of the glass substrate 1 while a crystalline underlayer 22 is formed on the side of the first magnetic layer 3.

The amorphous underlayer 21 is formed by stacking a plurality of layers. A second amorphous underlayer 212 is formed on the side of the glass substrate 1 while a first amorphous underlayer 211 is formed on the side of the first magnetic layer 3.

In the crystalline underlayer 22, a first crystalline underlayer 221 is formed on the side of the first amorphous underlayer 211 while a second crystalline underlayer 222 is formed on the side of the first magnetic layer 3.

Now, materials of the glass substrate and the respective layers will be described in detail.

The disk-shaped glass substrate 1 is an amorphous glass substrate and is composed of aluminosilicate. The surface of the glass substrate 1 is formed with a texture that provides the magnetic layer with a magnetic anisotropy in which magnetic properties are superior in the circumferential direction of the disk. This texture has substantially regular linear stripe grooves along the circumferential direction of the disk. The surface roughness of the glass substrate 1 is 4 nm in Ry and 0.4 nm in Ra. The surface roughness of the glass substrate and the orientation direction of the stripes of the texture were specified by the use of an atomic force microscope.

The second amorphous underlayer 212 is a CrTi alloy layer. The thickness is 200 Å. The second amorphous underlayer is nonmagnetic.

The first amorphous underlayer 211 is a WCr alloy layer. As will be described later, the first amorphous underlayer 211 was formed in an atmosphere containing $CO_2$ (carbon dioxide).

As a material forming the first amorphous underlayer 211, use was made of a material in which the content of Cr relative to W was 50 at %. The thickness of the first amorphous underlayer 211 is 75 Å. The first amorphous underlayer 211 is nonmagnetic.

The first crystalline underlayer 221 is a CrMn alloy layer. This CrMn alloy layer is a layer deposited by a later-described sputtering method. In this event, a material containing 20 at % Mn and the balance Cr was used as a sputtering target. The first crystalline underlayer 221 is nonmagnetic.

The first crystalline underlayer 221 has a body-centered cubic structure comprised of Cr and Mn having an atomic radius smaller than that of Cr. The first crystalline underlayer 221 has a body-centered cubic structure with a lattice constant smaller than that of a body-centered cubic structure formed by a Cr metal.

When viewing the disk plane from the top, a (002) plane of a body-centered cubic lattice is preferentially oriented in the first crystalline underlayer 221. The preferentially oriented plane can be analyzed by XRD (X-ray diffraction method).

The second crystalline underlayer 222 is a CrMoTi alloy layer. This CrMoTi alloy layer is a layer formed by a later-described sputtering method. In this event, a material containing 15 at % Mo, 5 at % Ti, and the balance Cr was used as a sputtering target. The second crystalline underlayer 222 is nonmagnetic.

The second crystalline underlayer 222 has a body-centered cubic structure containing Cr and Mo having an atomic radius greater than that of Cr. The second crystalline underlayer 222 has a body-centered cubic structure containing Cr and Ti having an atomic radius greater than that of Cr. The second crystalline underlayer 222 has a body-centered cubic structure with a lattice constant greater than that of a body-centered cubic structure formed by a Cr metal.

When viewing the disk plane from the top, a (002) plane of a body-centered cubic lattice is preferentially oriented in the second crystalline underlayer 222. The preferentially oriented plane can be analyzed by XRD (X-ray diffraction method).

In this embodiment, the thickness of the entire crystalline underlayer 22 including the first crystalline underlayer 221 and the second crystalline underlayer 222 is 100 Å.

In this invention, the crystalline underlayer 22 can be in the form of a plurality of layers. It is preferable that the first crystalline underlayer 221 contacting the first amorphous underlayer 211 have a body-centered cubic structure containing Cr and an element having an atomic radius smaller than that of Cr, while, the second crystalline underlayer 222 formed over the first crystalline underlayer 221 have a body-centered cubic structure containing Cr and an element having an atomic radius greater than that of Cr.

In this invention, the crystalline underlayer 22 can be in the form of a plurality of layers. It is preferable that the first crystalline underlayer 221 contacting the first amorphous underlayer 211 have a body-centered cubic structure with a lattice constant smaller than that of a Cr metal, while, the second crystalline underlayer 222 formed over the first crystalline underlayer 221 have a body-centered cubic structure with a lattice constant greater than that of a Cr metal.

The first magnetic layer 3 is a ferromagnetic layer having a hexagonal close-packed structure. The first magnetic layer 3 is made of a CoCrTa-based alloy.

The spacer layer 4 is a nonmagnetic layer having a hexagonal close-packed structure. The spacer layer 4 is made of a Ru material.

The second magnetic layer 5 is a ferromagnetic layer having a hexagonal close-packed structure. The second magnetic layer 5 is made of a CoCrPtB-based alloy.

The third magnetic layer 6 is a ferromagnetic layer having a hexagonal close-packed structure. The third magnetic layer 6 is made of a CoCrPtB-based alloy.

When viewing the disk plane from the top, a (11-20) plane of a hexagonal close-packed lattice is preferentially oriented in the magnetic layer. The c-axis of the hexagonal close-packed lattice of the magnetic layer is oriented parallel in the disk plane. The preferentially oriented crystal plane and the orientation of the c-axis can be analyzed by XRD (X-ray diffraction method).

The protection layer 7 is a layer mainly made of amorphous carbon. The lubrication layer 8 is a layer made of a fluoropolyether compound.

In this embodiment, magnetization of the first magnetic layer 3 and magnetization of the second magnetic layer 5 or the third magnetic layer 6 may be coupled antiparallel to each other through the spacer layer 4. In this embodiment, use may be made of exchange coupling media that couple a plurality of magnetic layers using exchange interactions. The type of exchange coupling is preferably antiparallel coupling. The antiparallel-coupled media are anti-ferro coupled media.

Subsequently, description will be made of a manufacturing method of the magnetic disk 100 shown in the figure.

At first, the treatment is carried out to form the texture on the surface of the disk-shaped glass substrate. The texture is formed on the surface of the glass substrate by bringing a polishing tape into contact with the glass substrate in a rotating state.

Then, on the glass substrate 1 comprising the texture, the underlayer 2, the first magnetic layer 3, the spacer layer 4, the second magnetic layer 5, and the third magnetic layer 6 are sequentially formed by a sputtering method. Successively, the protection layer 7 is formed by a plasma CVD method and the lubrication layer 8 is formed by a dipping method. In this manner, the magnetic disk 100 is manufactured. Hereinbelow, the film forming process by the sputtering method will be described in detail.

At first, the glass substrate 1 applied with the texture forming treatment is disposed in a vacuum chamber. Then, the glass substrate 1 is conveyed to a CrTi sputtering station where the second amorphous underlayer 212 is deposited on the glass substrate 1. In this event, a film forming atmosphere is set to an argon gas atmosphere. The degree of vacuum is 0.6 pascals.

Then, the glass substrate 1 is conveyed to a WCr sputtering station. In the WCr sputtering station, the glass substrate 1 is formed with the first amorphous underlayer 211. A film forming atmosphere is a mixed gas atmosphere in which the ratio of carbon dioxide gas to argon gas is set to 4 vol %. The degree of vacuum is 0.6 pascals.

Then, the glass substrate 1 is conveyed to a CrMn sputtering station. In the CrMn sputtering station, the glass substrate 1 is formed with the first crystalline underlayer 221. In this event, a film forming atmosphere is set to an argon gas atmosphere. The degree of vacuum is 0.6 pascals.

Then, the glass substrate 1 is conveyed to a CrMoTi sputtering station. In the CrMoTi sputtering station, the glass substrate 1 is formed with the second crystalline under layer 222. A film forming atmosphere is set to an argon gas atmosphere. The degree of vacuum is 0.6 pascals.

In the manner as described above, the underlayer 2 comprising the amorphous underlayer 21 and the crystalline underlayer 22 is formed.

Thereafter, in sequence, the first magnetic layer 3, the spacer layer 4, the second magnetic layer 5, and the third magnetic layer 6 are formed in an argon gas atmosphere under a vacuum of 0.6 pascals by the sputtering method.

In the manner as described above, the magnetic disk of the Example is manufactured.

The magnetic anisotropy ratio (Mrc/Mrr) was measured with respect to the magnetic disk of this Example and it was an excellent value of 1.81.

Then, using a magnetic head, a signal recording/reproducing test was conducted for the magnetic disk of the Example A at a linear recording density of 816 kfci and it was proved to be a magnetic disk suitable for being mounted on a hard disk drive (HDD) that performs recording/reproduction at an areal recording density exceeding 60 Gbits.

The preferential crystal orientation in the magnetic disk of the Example was evaluated using the XRD (X-ray diffraction) method and it was found that the (002) plane was preferentially oriented with respect to the disk plane in each of the underlayer being the CrMn layer having the first body-centered cubic structure and the underlayer being the CrMoTi layer having the second body-centered cubic structure.

No diffraction peaks were observed by XRD with respect to either the first amorphous underlayer 211 or the second amorphous underlayer 212.

Reference Example

A magnetic disk was manufactured in the same manner as that of the foregoing Example except that the first amorphous underlayer 211 in the Example was changed to a RuAl underlayer as a crystalline underlayer. The crystal structure of the RuAl underlayer is a B2-type crystal structure. The magnetic anisotropy ratio was measured in the same manner as in the Example and Mrc/Mrr was 1.

What is claimed is:

1. A method of manufacturing a magnetic disk, comprising:
   preparing a disk-shaped glass substrate having a surface formed with a texture having substantially regular stripes along a disk circumferential direction,
   forming an amorphous CrTi alloy underlayer comprising a CrTi alloy directly on the glass substrate in an argon atmosphere;
   forming another amorphous underlayer on the CrTi alloy underlayer in an atmosphere containing at least carbon and oxygen using a material containing a VIa group element, the another amorphous underlayer directly contacting with the CrTi alloy underlayer,
   forming at least one crystalline underlayer on the another amorphous underlayer in an atmosphere containing argon, and
   forming at least a magnetic layer over the another amorphous underlayer.

2. The magnetic disk manufacturing method according to claim 1, wherein:
   the another amorphous underlayer is formed by reactive sputtering in the atmosphere containing at least carbon and oxygen using a target containing the VIa group element.

3. A method of manufacturing a magnetic disk, comprising:
   preparing a disk-shaped glass substrate having a surface formed with a texture having substantially regular stripes along a disk circumferential direction,
   forming an amorphous underlayer comprising a CrTi alloy directly on the glass substrate in an argon atmosphere;
   forming another amorphous underlayer containing a VIa group element on the CrTi alloy underlayer, the another amorphous underlayer directly contacting with the CrTi alloy underlayer,
   bringing the another amorphous underlayer into contact with an atmosphere containing at least carbon and oxygen, and
   forming at least a magnetic layer over the another amorphous underlayer.

4. The magnetic disk manufacturing method according to any one of claim 1, 2 or 3, wherein:
   the prepared glass substrate is disposed in a vacuum chamber, and
   each of the CrTi alloy underlayer and the another amorphous underlayer is formed without performing heat treatment.

5. The magnetic disk manufacturing method according to claim 1 or 3, wherein:
   the atmosphere containing at least carbon and oxygen is an atmosphere containing carbon dioxide or an atmosphere containing carbon monoxide.

6. The magnetic disk manufacturing method according to claim 1 or 3, wherein:
   the VIa group element is W or Mo.

7. The magnetic disk manufacturing method according to claim 1 or 3, wherein:
   the material containing the VIa group element is a WCr-based alloy material or a MoCr-based alloy material.

8. The magnetic disk manufacturing method according to claim 7, wherein:
   the WCr-based alloy material or the MoCr-based alloy material contains Cr set to 25 at % to 75 at % in composition ratio.

9. The magnetic disk manufacturing method according to claim 1 or 3, wherein:
   the atmosphere contains a combination of carbon and oxygen in an amount sufficient to increase a magnetic anisotropy.

* * * * *